United States Patent
Secer (10) Patent No.: US 7,209,968 B1
(45) Date of Patent: Apr. 24, 2007

(54) SYSTEM AND METHOD FOR RECOVERING MANAGEMENT OF NETWORK ELEMENT(S) RESPONSIVE TO FAILURE OF A DISTRIBUTED GATEWAY

(75) Inventor: Semih Secer, Fair Oaks, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 822 days.

(21) Appl. No.: 09/870,159

(22) Filed: May 29, 2001

(51) Int. Cl.
*G06F 15/173* (2006.01)

(52) U.S. Cl. .......................... 709/226; 709/235; 714/4; 707/10

(58) Field of Classification Search ................ 709/224, 709/226, 228, 232, 217, 220, 227, 223, 225, 709/219, 235, 229; 714/4; 707/100, 10; 713/153
See application file for complete search history.

(56) References Cited

U.S. PATENT DOCUMENTS

| | | | | |
|---|---|---|---|---|
| 5,918,013 A * | 6/1999 | Mighdoll et al. | ............ | 709/217 |
| 6,185,695 B1 * | 2/2001 | Murphy et al. | ................. | 714/4 |
| 6,195,680 B1 * | 2/2001 | Goldszmidt et al. | ........ | 709/203 |
| 6,332,157 B1 * | 12/2001 | Mighdoll et al. | ............ | 709/217 |
| 6,374,297 B1 * | 4/2002 | Wolf et al. | ................. | 709/226 |
| 6,507,908 B1 * | 1/2003 | Caronni | ....................... | 713/153 |
| 6,523,130 B1 * | 2/2003 | Hickman et al. | ............... | 714/4 |
| 6,564,252 B1 * | 5/2003 | Hickman et al. | ............ | 709/214 |
| 6,567,813 B1 * | 5/2003 | Zhu et al. | .................... | 707/100 |
| 6,594,775 B1 * | 7/2003 | Fair | .............................. | 714/4 |
| 6,609,213 B1 * | 8/2003 | Nguyen et al. | ................ | 714/4 |
| 6,625,750 B1 * | 9/2003 | Duso et al. | .................... | 714/11 |
| 6,760,765 B1 * | 7/2004 | Asai et al. | .................. | 709/226 |
| 6,799,209 B1 * | 9/2004 | Hayton | ........................ | 709/223 |
| 6,842,784 B1 * | 1/2005 | Black | ......................... | 709/225 |
| 2001/0003823 A1 * | 6/2001 | Mighdoll et al. | ........... | 709/200 |
| 2002/0120717 A1 * | 8/2002 | Giotta | ........................ | 709/219 |

OTHER PUBLICATIONS

U.S. Appl. No. 09/469,025, Tentij.
U.S. Appl. No. 09/770,427, Secer.
U.S. Appl. No. 09/816,693, Secer.

* cited by examiner

*Primary Examiner*—Khanh Dinh (57) ABSTRACT

A system and method are disclosed which enable efficient recovery of management of one or more network elements responsive to failure of a gateway responsible for managing such one or more network elements. According to at least one embodiment, operation of a plurality of distributed gateways that are each responsible for managing one or more network elements is monitored. Through such monitoring, failure of one of the distributed gateways may be efficiently detected, and responsive to detection of a failed gateway, management of the network element(s) for which such failed gateway had management responsibility may be efficiently recovered by allocating responsibility of management activities for which a detected failed gateway had responsibility to one or more available gateways. Allocation of such management activities may be performed in a manner that balances the operational load placed on such available gateways.

56 Claims, 5 Drawing Sheets

SYSTEM AND METHOD FOR RECOVERING MANAGEMENT OF NETWORK ELEMENT(S) RESPONSIVE TO FAILURE OF A DISTRIBUTED GATEWAY

RELATED APPLICATIONS

This application is related to co-pending application entitled "SYSTEM AND METHOD FOR POLICY-BASED NETWORK MANAGEMENT," assigned Ser. No. 09/469,025, filed Dec. 21, 1999; co-pending application entitled "SYSTEM AND METHOD FOR MANAGING A COMMUNICATION NETWORK UTILIZING STATE-BASED POLLING," assigned Ser. No. 09/770,427, filed Jan. 26, 2001; and application entitled "OBJECT-DRIVEN NETWORK MANAGEMENT SYSTEM ENABLING DYNAMICALLY DEFINABLE MANAGEMENT BEHAVIOR," assigned Ser. No. 09/816,693, filed Mar. 22, 2001 now U.S. Pat. No. 6,990,518 all of which are assigned to a common assignee, the disclosures of which are hereby incorporated herein by reference.

TECHNICAL FIELD

This application relates in general to recovery of management of network elements responsive to failure of a gateway implemented for network management, and more specifically to a system and method in which gateways for managing network elements are implemented in a distributed fashion and are communicatively coupled to a central management system, wherein failure of a gateway is detected in a timely manner and management of network element(s) for which such failed gateway had management responsibility is efficiently recovered to minimize the time in which such network element(s) are without management.

BACKGROUND

The information-communication industry is an essential element of today's society, which is relied upon heavily by most companies, businesses, agencies, educational institutions, and other entities, including individuals. As a result, information service providers such as telephone, cable, and wireless carriers, Internet Service Providers (ISPs) and utility companies all have the need to deploy effective systems suitable for servicing such a demand. Accordingly, network management and operations have become crucial to the competitiveness of communication companies, utilities, banks and other companies operating Wide Area Networks (WANs) of computer devices and/or other network types and devices, including SONET, Wireline, Mobile, Internet Protocol (IP) devices, etcetera. For instance, many companies currently use customized "legacy" network management systems (NMSs) and operations support systems (OSSs). Various implementations of NMSs/OSSs are available in the prior art for managing networks and network elements.

Thus, management systems ("MSs," which encompass both NMSs and OSSs) have been implemented in the prior art for managing communication networks and network elements. Given that it is often desirable to manage various network elements (e.g., various types of devices, including without limitation routers, switches, computer equipment, etcetera), various types of management systems have been developed for managing such elements. Further, because different types of network elements may communicate in different protocols, management systems may utilize different processes for managing different types of network elements. For instance, processes that may be referred to as "gateway" processes are sometimes implemented in management systems for managing particular types of network elements. For instance, a Simple Network Management Protocol (SNMP) gateway process may be implemented for managing SNMP devices, and a Common Management Information Protocol (CMIP) gateway process may be implemented for managing CMIP devices. Thus, one or more gateway processes may be implemented for managing network elements that communicate in a particular communication protocol.

Such gateway processes may, for example, receive unsolicited messages from their respective network elements and/or may poll their respective network elements for certain information. Prior art network management systems commonly recognize faults (or "traps") generated within the network and/or utilize polling of the network elements to provide management. For example, IP and SNMP devices may generate fault messages (which may be referred to as traps), which are unsolicited messages that may be received by the management system. Examples of such trap messages include messages that indicate a network element's CPU utilization is too high, a network element just rebooted, available data storage capacity is low on a network element, and an interface on a network element is down, as examples. Various other types of unsolicited trap messages may be generated by a network element and received by a network management system, as those of ordinary skill in the art will recognize. Such messages are generally generated in a defined protocol, such as SNMP, which the management system can recognize (e.g., a gateway process may recognize) to process the received messages. As further examples, such information can also be received through TL1, CMIP, or ASCII messages, such as log files for different network elements.

Some network management systems may desire information regarding the performance of network elements that is not provided through unsolicited messages generated by such network elements. In such case, gateways may be implemented to poll their respective network elements for particular information. For instance a gateway may be implemented to poll its respective network element(s) to gather information about various operational characteristics of such network element(s). Gateways of prior art systems are typically implemented to periodically poll their respective network elements according to pre-set time intervals. For instance, a gateway may be pre-set to poll its respective network element(s) once every five minutes or once every twenty minutes, as examples. Gateways typically poll network element(s) to request values for various variables detailing information about the operation/performance of the network element(s). For example, a gateway may periodically poll a network element to determine whether the network element is operational and responding to the poll. If a network element fails to respond to such a poll, such failure to respond may be indicative of a problem with the network element, such as the network element having a hardware or software failure. As other examples, a gateway may periodically poll a network element to determine the workload being placed on such network element, the network element's available memory capacity, etcetera.

Depending on the amount of intelligence implemented within such gateway process, it may evaluate the performance of its respective network elements (e.g., based on unsolicited messages and responses to polling) and may trigger certain actions as necessary to manage the network elements. For instance, upon a fault message being received for a particular network element, the gateway process may generate an alert to a network administrator to notify the network administrator of such fault condition. As a further example, once a gateway receives the variable values from the network element(s) in response to a poll, the gateway may then process such variable values to monitor the operation of the network element(s). For instance, if a gateway polls a network element for a response and fails to receive such a response, the gateway may provide an alert to the network administrator (e.g., by presenting an alert message to a computer workstation) notifying the network administrator of a problem with the network element. Similarly, if a gateway polls a network element for its available memory and determines that such network element has little or no memory available, the network administrator may be alerted as to such condition.

Considering the great reliance that may be placed on such gateway processes in management systems for managing network elements, it becomes very desirable to efficiently detect and resolve failures of such gateway processes. For instance, if a gateway process fails for some reason, its respective network elements may go unmanaged. That is, when a gateway process fails, management of its respective network elements is interrupted, which is typically undesirable to a network provider. Such an interruption in the management of the network elements is typically undesirable to a network provider because, for example, an event may occur that effects the network elements during such interruption and the network provider would have no knowledge of such event.

Prior art implementations of network management systems often fail to efficiently detect failure of a gateway process. For example, a gateway process may fail without the management system or network administrator realizing such failure. For instance, if messages are not being received from a gateway process, the management system may assume that the gateway process is operational but simply has no messages to report to the management system (e.g., may assume that the gateway simply has nothing to report regarding its respective network elements). Thus, in some network management systems of the prior art, a gateway responsible for managing particular network elements may have failed long before the management system recognizes such gateway failure.

Also, prior art implementations of network management systems often fail to efficiently resolve the failure of a gateway process. For example, it may take an undesirably long time for another gateway process to be initiated for managing the network elements of the failed gateway process. Additionally, while a solution is being implemented to effectively recover management of the network elements of the failed gateway process, many messages (or events) regarding such network elements may be lost. That is, unsolicited messages (e.g., fault messages) are not being received from the network elements during the time required for recovering management, and polling of the network element is also not being performed. Once a management recovery solution is implemented (e.g., once another gateway process is initiated for managing such network elements), management of the network elements may resume. However, because management was interrupted, events may have transpired during such interruption indicating severe performance problems with one or more of the network elements, of which the newly initiated gateway process is unaware. Typically, messages lost during such interruption are not recovered, and therefore the newly initiated gateway may not efficiently recognize such severe performance problems.

SUMMARY OF THE INVENTION

The present invention is directed to a system and method which enable efficient recovery of management of one or more network elements responsive to failure of a gateway responsible for managing such one or more network elements. According to at least one embodiment, a method is disclosed for recovering management of one or more network elements, which comprises monitoring operation of a plurality of distributed gateways that are each responsible for managing one or more network elements. Through such monitoring, failure of one of the distributed gateways may be efficiently detected, and responsive to detection of a failed gateway, management of the network element(s) for which such failed gateway had management responsibility may be efficiently recovered by assigning management responsibility to at least one other of the plurality of distributed gateways.

In certain embodiments, the management activities for which a detected failed gateway has responsibility may be determined. For instance, a management system to which the plurality of distributed gateways may be communicatively coupled may maintain an activity log that includes identification of management activities that each of the gateways has responsibility for performing. Such management activities for which a detected failed gateway had responsibility may be assigned from the failed gateway to one or more of the other gateways. In certain embodiments, one or more available gateways may be determined from the plurality of distributed gateways, which are available for assuming at least a portion of the management activities of a detected failed gateway. Such "available gateways" may be determined as gateways that are local to the failed gateway and/or share a common communication protocol with the failed gateway, as examples. The management activities may be allocated (or distributed) to the determined available gateways. In certain embodiments, such allocation may be performed in a manner that balances the operational load placed on such available gateways. For instance, the operational load of the available gateways may be dynamically determined, and the added operational load that will result from each of the management activities may be considered to allocate such management activities in a manner that approximately balances the resulting operational loads placed on the available gateways.

According to at least one embodiment, a system is disclosed for recovering management of one or more network elements responsive to failure of a distributed gateway. In one embodiment, a system includes a plurality of distributed gateways each communicatively coupled to one or more network elements and each having responsibility for managing such one or more network elements to which they are coupled. A gateway monitoring system is further provided, which is communicatively coupled to the plurality of distributed gateways. The gateway monitoring system is operable to detect a failure of any one of the distributed gateways to which is communicatively coupled. In certain embodiments, the gateway monitoring system periodically polls such distributed gateways to timely detect a failure of any of such distributed gateways. Also, a management recovery system may be communicatively coupled to the plurality of distributed gateways. In certain embodiments, such management recovery system may be integrated with the gateway monitoring system, and/or the management recovery system may be implemented within a central management system (MS) to which the plurality of distributed gateways are communicatively coupled. According to various embodiments of the present invention, the management recovery system is operable to autonomously recover management of the network elements for which a detected failed gateway had management responsibility. As described above, the management recovery system may, in certain embodiments, perform load balancing in allocating management activities to available gateways for recovering management of the network elements.

In view of the above, it should be recognized that one technical advantage of at least one embodiment of the present invention is that failure of gateways may be efficiently detected and recovery of management activities for which a failed gateway had responsibility may be efficiently recovered. Further, in certain embodiments, such management activities may be recovered in a manner that balances the operational load placed on the gateways available for assuming performance of such management activities. Additionally, it should be recognized that the detection and recovery techniques disclosed in various embodiments of the present invention are applicable within any type of client/server environment, and therefore such embodiments may be implemented for recovering various types of client processes that have failed.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION

Various embodiments of the present invention are described herein with reference to the above Figs., wherein like reference numerals represent like parts throughout the several views. To better appreciate the various embodiments for gateway recovery disclosed herein, it may be helpful for the reader to have an understanding of typical gateway implementations within network management systems of the prior art. Thus, typical prior art implementations of gateways within management systems are described in further detail herein.

Figure 1:
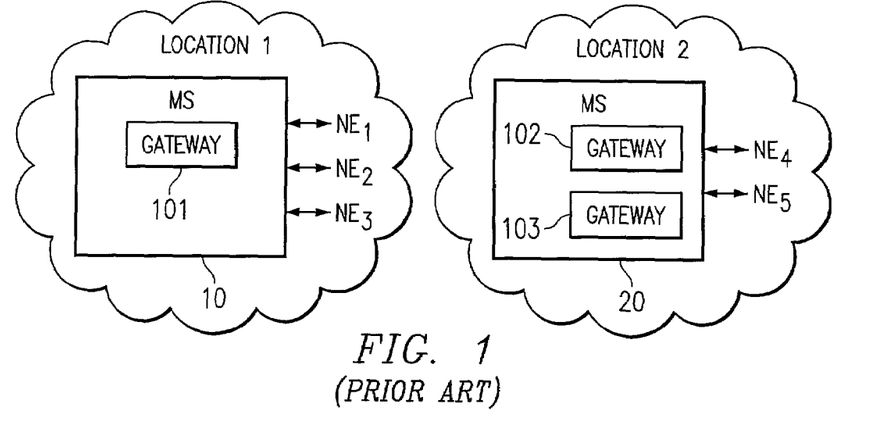
FIG. 1 shows an exemplary implementation of a prior art network management system.

While network elements of a communication network may be very distributed, prior art management systems are typically not distributed. Gateways have been implemented in prior art network management systems for polling and monitoring the operations of various network elements. An exemplary implementation of a prior art network management system is shown in FIG. 1. As shown, management system (MS) 10 may be implemented in a first geographical location ("Location 1"), and MS 20 may be implemented in a second geographical location ("Location 2"). For example, geographic Location 1 may be one region of the United States, and geographic Location 2 may be another region of the United States. MS 10 includes gateway process 101, which receives unsolicited messages (traps) and/or polls network element(s) within geographic Location 1 to gather information about various operational characteristics of such network element(s). For instance, in the example of FIG. 1, gateway 101 polls (or requests information from) network elements NE1, NE2, and NE3. Specifically, gateway 101 is implemented to receive unsolicited messages and/or poll such network elements in the appropriate communication protocol. For instance, $NE_1$, $NE_2$, and $NE_3$ may each be SNMP devices, and gateway 101 may be implemented to communicate in SNMP in order to manage such SNMP network elements.

MS 20 includes multiple gateway processes 102 and 103, which may each be implemented to manage network elements within geographic Location 2 that communicate via different communication protocols. For instance, gateway 102 may be implemented to manage SNMP devices, while gateway 103 may be implemented to manage CMIP devices. Thus, for example, $NE_4$ may be a SNMP device, which gateway 102 manages (through receiving unsolicited messages and/or by polling such network element), and $NE_5$ may be a CMIP device, which gateway 103 manages.

As shown in FIG. 1, the gateway processes are typically not distributed from the network management system, but are instead included within the network management system. For instance, gateway 101 is included within MS 10, and gateways 102 and 103 are included within MS 20. As a result, a great operational burden is placed on such management systems 10 and 20 (and their respective system resources) because all of the poll responses and gateway processing is included within such systems. Also, such arrangements typically fail to penetrate networks secured by fire walls, as they are not distributed beyond such fire walls. Additionally, communication traffic to/from the management systems 10 and 20 may become congested, as all necessary communication for managing the network elements of each respective geographic area is directed to/from such management systems 10 and 20.

From time to time, a gateway process, such as gateway process 101, 102, or 103 may fail, thereby resulting in the network elements being managed thereby to go unmanaged. Gateway processes (which are responsible for protocol translations, for such protocols as SNMP and CMIP) reside in a common system (e.g., within management systems 10 and 20 of FIG. 1). In most instances, when the gateway processes are down, the management system is also down, or such management system falls over to a backup system, which in typical prior art implementations is also a non-distributed system. Thus, in such prior art implementations, a customer may purchase and implement multiple copies of the same MS solution to enable a backup system, and because such backup system is typically a non-distributed system, it presents the same problems described above for such non-distributed MS systems (e.g., great operational burden placed on MS, traffic congestion, etc.).

As described above, prior art implementations of network management systems often do not efficiently detect failure of a gateway process. For example, gateway process 101 may fail without management system 10 or a network administrator realizing such failure. Thus, in some network management systems of the prior art, a gateway responsible for managing particular network elements may have failed long before the management system recognizes such gateway failure. Also, prior art implementations of network management systems often fail to efficiently resolve the failure of a gateway process. For example, it may take an undesirably long time for another gateway process to be initiated for managing the network elements of the failed gateway process. Additionally, while a solution is being implemented to effectively recover management of the network elements of the failed gateway process, many messages (or events) regarding such network elements may be lost.

In some management systems, such as that disclosed in co-pending patent application Ser. No. 09/770,427 entitled "SYSTEM AND METHOD FOR MANAGING A COMMUNICATION NETWORK UTILIZING STATE-BASED POLLING" and co-pending application Ser. No. 09/816,693 entitled "OBJECT-DRIVEN NETWORK MANAGEMENT SYSTEM ENABLING DYNAMICALLY DEFINABLE MANAGEMENT BEHAVIOR," the gateways may be distributed to ease the operational burden on the MS. However, in distributed systems the complexity of the above-described problems of recognizing gateway failure and recovering management of network elements managed by a failed gateway may be increased. That is, it is relatively simpler for a MS to recognize failure of a gateway process executing on such MS, than for a MS to determine whether a gateway that is distributed therefrom has failed. Additionally, distributed gateways present the potential for increased delays in recovering management of network elements managed by a failed gateway. Thus, because it may be desirable to implement gateways in a distributed fashion to gain improved performance in the management of network elements (e.g., by easing the operational burden of the MS to which such gateways are communicatively coupled), a desire exists for an efficient method for recognizing failure of such distributed gateways and efficiently recovering management of network elements managed by a failed gateway. Further, when the gateway processes are implemented in a distributed fashion, it becomes desirable to provide the ability to monitor such distributed processes, and upon failure of a gateway process, it is often desirable to recover management of its respective network elements in a manner that determines the activities that such failed gateway was responsible for performing, autonomously distributes such activities in a manner that minimizes down time (i.e., minimizes the amount of time that network elements are not managed), and utilizes dynamic load balancing between available gateways in recovering management of the network elements. Preferably, such recovery is an automated process that may be transparent to the user (although, a user may be alerted as to the failure of the gateway process, the recovery of management of its network elements may require little or no human involvement).

At least one embodiment of the present invention utilizes distributed gateways for managing network elements. An example of such a distributed approach for a network management system is further shown in FIG. 2, which is described herein below. In certain embodiments, state models may be defined/altered by a user (e.g., a system administrator) at a central management system (MS) and then pushed out to the distributed gateways, an example of which is further described in co-pending patent application Ser. No. 09/770,427 entitled "SYSTEM AND METHOD FOR MANAGING A COMMUNICATION NETWORK UTILIZING STATE-BASED POLLING," the disclosure of which has been incorporated herein by reference. For instance, state models may be defined/altered by a user at a centralized MS and then pushed out to one or more distributed gateways via a suitable communication network that communicatively couples the centralized MS to such distributed gateways. Of course, in alternative embodiments state models may not be used for management within the gateways.

Figure 2:
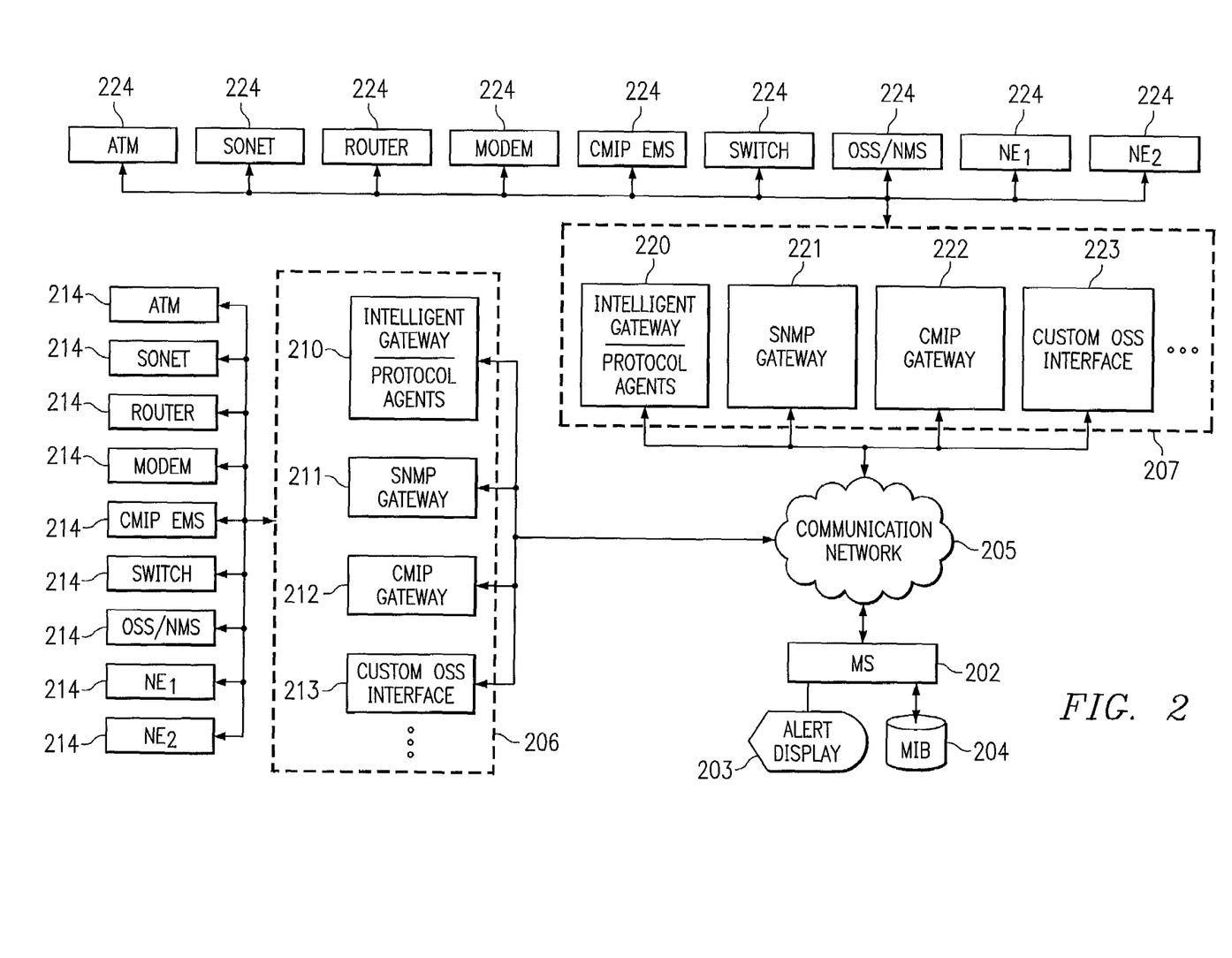
FIG. 2 shows an example of a distributed approach for a network management system that may be implemented in various embodiments of the present invention.

As shown in FIG. 2, central MS 202 may be communicatively coupled to numerous gateways distributed about the network for managing various network elements. As shown, central MS 202 may be communicatively coupled to distributed gateways or groups of distributed gateways via communication network 205. Communication network 205 may be any suitable type of communications network including, but not limited to direct computer to computer connection, a wide area network (WAN), modem to modem connection, the Internet, a combination of the above, or any other communications network now known or later developed within the networking arts which would permit communication between centralized MS 202 and distributed gateways.

For example, gateway group 206 may be implemented at one geographic location of a managed network and group 207 may be implemented at another geographic location of such managed network. Group 206 may include various gateways for monitoring (e.g., polling) particular types of network elements. For instance, each gateway within group 206 may monitor network elements having particular communication protocols, including as examples intelligent gateway 210, SNMP gateway 211, CMIP gateway 212, and custom OSS interface gateway 213, which may monitor various network element types 214 having various protocols, such as ATM, SONET, routers, modems, CMIP EMSs, switches, OSSs/NMSs, as well as various other network elements local to group 206. Likewise, group 207 may include various gateways for monitoring (e.g., polling) particular types of network elements. Each gateway of group 207 may monitor network elements having particular communication protocols, including as examples intelligent gateway 220, SNMP gateway 221, CMIP gateway 222, and custom OSS interface gateway 223, which may monitor various network element types 224 having various protocols, such as ATM, SONET, routers, modems, CMIP EMSs, switches, OSSs/NMSs, as well as various other network elements local to group 207. Each of the distributed gateways may, for example, be any suitable processor-based device operable to manage (e.g., receive unsolicited messages and/or poll) its respective network elements.

In a preferred embodiment, data collected by the distributed gateways may be communicated to central MS 202. For example, polling services (which may include state models) may be loaded onto the distributed gateways of groups 206 and 207, and such gateways may execute the polling services to monitor their respective network elements. In this manner, the gateways can act as filters by only communicating necessary data about the network elements back to central MS 202, thereby alleviating much of the processing and communication traffic burden from central MS 202.

The management system of various embodiments of the present invention is preferably object-driven. An example of such an object-driven management system is further described in co-pending patent application Ser. No. 09/816, 693 entitled "OBJECT-DRIVEN NETWORK MANAGEMENT SYSTEM ENABLING DYNAMICALLY DEFINABLE MANAGEMENT BEHAVIOR," the disclosure of which has been incorporated herein by reference. For instance, network elements and management behavior are preferably represented by objects within the management system. Such objects may be stored in management information base (MIB) 204, which may, for instance, be a database or other suitable data storage management. MIB 204 is communicatively coupled to central MS 202. More specifically, MIB 204 may be integrated within or external to central MS 202, and a management process executing on central MS 202 is capable of accessing MIB 204 to store/retrieve objects. Also, as shown in FIG. 2, one or more alert displays 203 (e.g., work stations equipped with input and output devices) may be communicatively coupled to central MS 202 for enabling interaction with a user (e.g., a network administrator).

Because various embodiments utilize objects to define management behavior, the management system of such embodiments provides great flexibility in allowing objects to be created/modified in order to dynamically define management behavior. Additionally, objects may have an attribute specifying the relationship of such objects to the network elements and/or gateways. That is, a behavior object preferably includes a relationship attribute defining the relationship of the behavior within the managed network. Accordingly, upon an object being created/modified, the central MS may determine to which gateways and/or network elements the object relates and implement the management behavior defined by such object for the related network elements and/or gateways. For instance, a user (e.g., network administrator) may define a management behavior, such as management behavior responsive to particular trap messages or management behavior for polling network elements. The user may specify one or more distributed gateways which need to execute the defined management behavior (e.g., need to respond to particular trap messages or perform defined polling activities), and such gateways may be identified in a relationship attribute of the object defining the management behavior. As a result, central MS 202 may communicate (e.g., "push") the created management behavior (e.g., the object defining such management behavior) to the appropriate gateways to which the management behavior relates. Thereafter, a user may modify the management behavior at the central MS 202, and such modification is then automatically communicated to the appropriate gateways.

Because the gateways are distributed from MS 202, it may be desirable for MS 202 to be capable of efficiently detecting a failure of a gateway and efficiently recovering management of network elements for which such failed gateway was responsible. Each gateway within group 206 and 207 may be managing (e.g., polling and/or receiving unsolicited messages from) a plurality of network elements. Depending on the size of the managed network, there may be hundreds/thousands of network elements (e.g., IP devices) being managed by a certain gateway. Fault management (e.g., management of unsolicited messages) and performance management (e.g., polling of network elements) depends on the collection of data from the network elements. Failure of a gateway typically results in loss of such management data, which may present a severe problem for network management operators (e.g., network administrators). Accordingly, it becomes desirable to efficiently detect failure of a gateway and to efficiently recover management of network elements for which a failed gateway was responsible.

Figure 3:
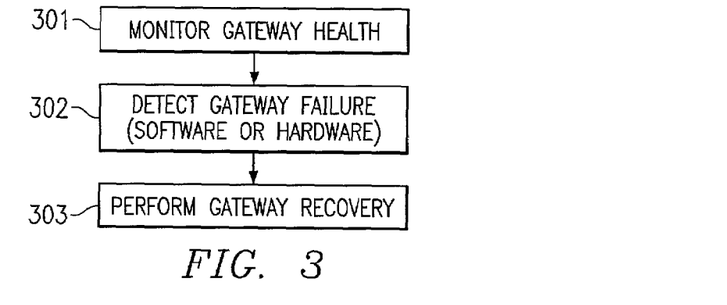
FIG. 3 shows an approach that may be implemented for a preferred embodiment of the present invention to ensure efficient detection and recovery of management for failed gateways.

A preferred embodiment of the present invention implements a three-step approach to ensure efficient detection and recovery of management for failed gateways. Such three-step approach is shown in FIG. 3. As shown, in a preferred embodiment, the health of the distributed gateways is monitored in step 301. For instance, in certain implementations, a gateway monitoring system (which may be implemented within the central MS) monitors the health of the distributed gateways. In step 302, a gateway failure, such as a software and/or hardware failure, is detected. In certain implementations, the gateway monitoring system detects such a gateway failure. In step 303, gateway recovery is performed. Gateway recovery, as used herein, refers to recovery of management of network elements for which a failed gateway is responsible. In at least one embodiment, such recovery of management is achieved by reassigning management of such network elements for which the failed gateway was responsible to an available, operational gateway. Thus, by having an available gateway efficiently take over management of the elements for which the failed gateway was responsible, management of such elements may be recovered in a timely manner.

Additionally, the failed gateway itself may have its proper operation restored by, for example, repairing/replacing all or a portion of such failed gateway. Once operation is restored to the failed gateway, it may resume management of the network elements. Thus, recovery of management of network elements for which a failed gateway is responsible (or "gateway recovery" or "management recovery") is performed in step 303 responsive to detection of a failed gateway, and efforts to achieve restoration of the operation of such failed gateway may also be initiated in certain embodiments.

According to at least one embodiment, monitoring of gateway health is achieved (at least in part) by polling the distributed gateways. For instance, in one embodiment, a gateway monitoring system may be implemented to periodically poll the distributed gateways for information about their operation. In certain embodiments, such gateway monitoring system may be implemented within the central MS. In a preferred embodiment, the gateway monitoring system is capable of monitoring both the gateway process (e.g., software executing on the gateway) and the gateway hardware (e.g., the processor-based device on which the gateway process is implemented). When implemented in a distributed arrangement, gateways may fail for various reasons, such as the gateway process (e.g., software) may fail, the hardware on which the gateway process is implemented may fail, and/or the network connectivity between the MS and a distributed gateway may fail (i.e., connectivity is broken). In certain embodiments, the MS may have intelligence to determine the type of gateway failure encountered (e.g., whether it is gateway process failure, gateway hardware failure, or network connectivity failure). For instance, if the failure is a failure with the gateway process or gateway hardware, the MS can typically communicatively access the gateway hardware (e.g., can ping the gateway's box). If a network connectivity problem exists, the MS may not even be capable of communicatively accessing the gateway box, thereby indicating that a communication link from the MS and the gateway box is down, and the gateway box itself may or may not have an operational problem. The MS may be implemented to monitor the gateway's hardware (box) and software processes, as well as the communication ports. Preferably, the central MS can make the distinction based on such monitoring of such entities whether a failure is the result of a software, hardware, resources, or port problem. In embodiments that detect the type of failure, the reason for such failure may be presented to a user (e.g., a system administrator) and/or other actions may be taken to attempt to resolve the failure (e.g., the MS may autonomously open a trouble ticket for the gateway and/or may request appropriate technical service for the gateway).

Figure 4:
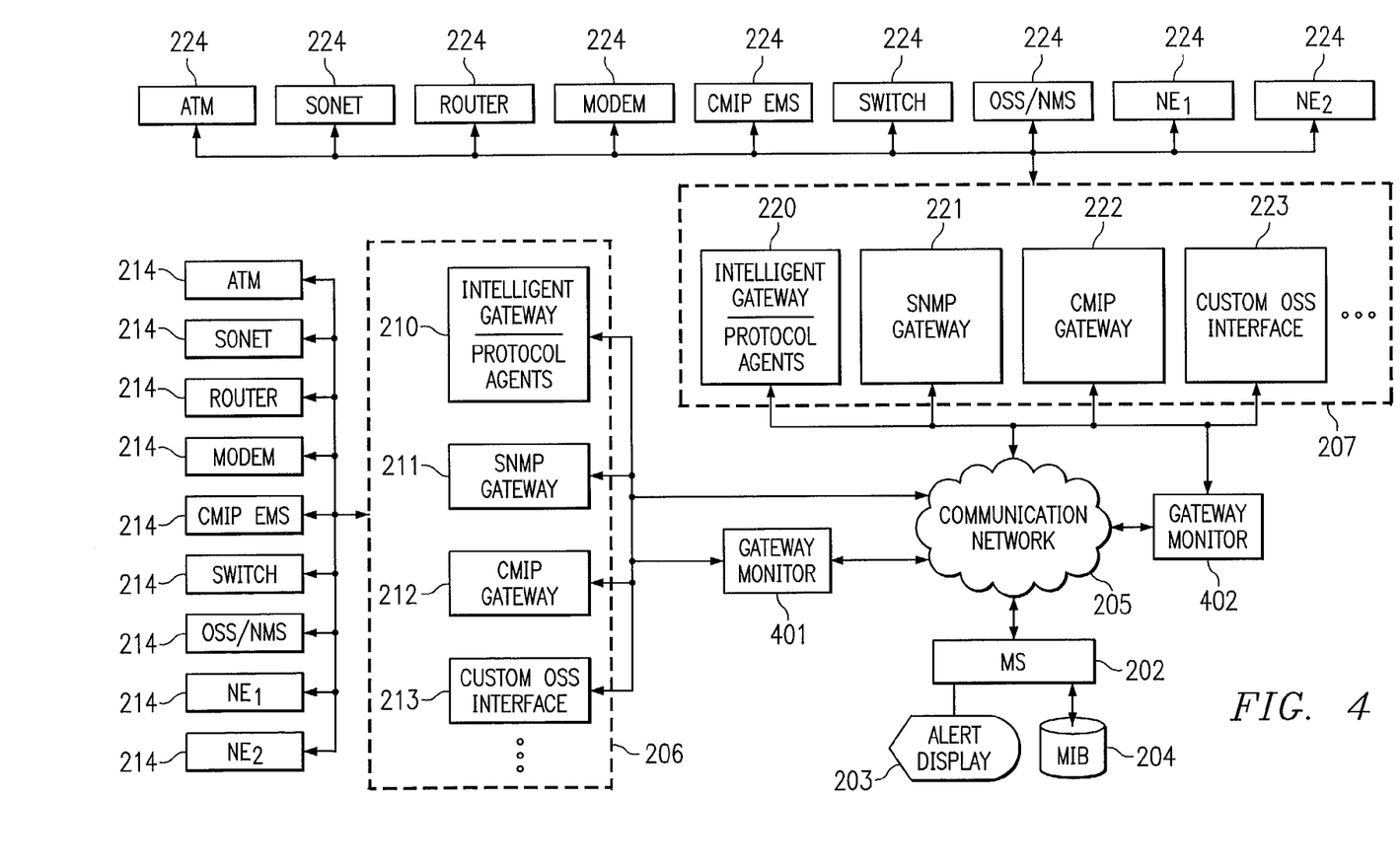
FIG. 4 shows an exemplary implementation of a distributed management system of one embodiment in which gateway monitoring systems are included therein.

It should be understood that according to various embodiments, rather than (or in addition to) the gateway monitoring system being implemented at the central MS, such gateway monitoring system may be a separate system that is communicatively coupled to the central MS. For instance, in certain embodiments, a gateway monitoring system may be implemented at each of the locations at which gateways are distributed. FIG. 4 shows an exemplary implementation of gateway monitoring systems included within the distributed management system of FIG. 2. In the example of FIG. 4, gateway monitoring system 401 is arranged to monitor gateway group 206, and gateway monitoring system 402 is arranged to monitor gateway group 207. Such gateway monitoring systems 401 and 402 may comprise any suitable processor-based device executable to poll their respective gateways. For instance, gateway monitoring systems 401 and 402 may each comprise a processor-based device operable to execute polling instructions to monitor the operation of their assigned gateways (e.g., to monitor each gateway's software and hardware to detect failures thereof). Gateway monitoring systems 401 and 402 may further comprise memory to which such polling instructions are stored. The term "memory" is used broadly herein, and is intended to encompass any suitable data storage device now known or later discovered, including as examples random access memory (RAM), disk drives, floppy disks, optical discs (e.g., Compact Discs (CDs) and Digital Versatile Discs (DVDs)), and other data storage devices. As shown in the example of FIG. 4, gateway monitoring systems 401 and 402 are communicatively coupled to central MS 202 via communication network 205. Accordingly, in certain implementations, the polling instructions to be executed by such gateway monitoring systems 401 and 402 may be communicated thereto from central MS 202. Also, upon gateway monitoring system 401 and 402 detecting failure of a gateway, such failure may be communicated therefrom to central MS 202 via communication network 205.

Figure 5:
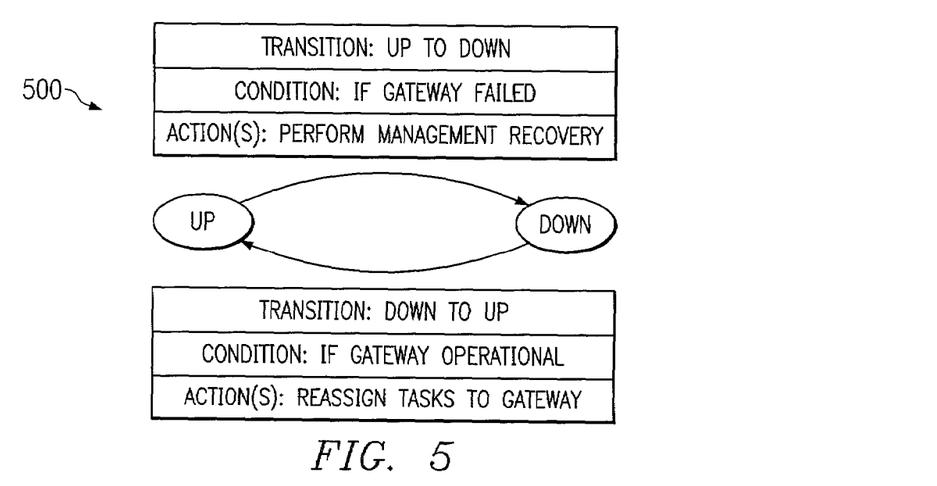
FIG. 5 shows an example of a state model that may be implemented within a state-based approach to monitoring distributed gateways of at least one embodiment of the present invention.

According to at least one embodiment, a state-based approach to monitoring the distributed gateways is implemented. That is, each distributed gateway has associated therewith a particular "state" depending on the operation of such gateway. Turning to FIG. 5, an example of a state-based approach to monitoring the distributed gateways is shown. More specifically, state-based model 500 is shown, which defines two states defined for a gateway, i.e., "UP" state and "DOWN" state. As further shown, state model 500 includes two transitions that have been defined, i.e., a transition from the UP state to the DOWN state, and a transition from the DOWN state to the UP state. Thus, a gateway may be in one of two states: UP or DOWN. If the gateway is in the UP state, then it is operational. For instance, the gateway monitoring system has not detected failure of the hardware or software of the gateway. If, on the other hand, the gateway is in the DOWN state, this indicates that the gateway has failed. For instance, if the gateway monitoring system detects failure of the gateway's hardware or software, the gateway's state becomes DOWN.

Model 500 includes conditions that have been defined to specify when each transition is to be triggered. In this example, if the gateway to which model 500 applies has failed (e.g., either its hardware or software has failed), then the state of the gateway transitions from UP to DOWN (because the condition for the UP to DOWN transition is satisfied), and if operation of the gateway is restored, then the state of the gateway transitions from DOWN back to UP.

Transition actions may also be defined within model 500. For instance, if a gateway's state transitions from UP to DOWN, indicating failure of the gateway, actions may be triggered to perform management recovery for the failed gateway's network elements. Such management recovery actions are further described below. As an example, management tasks performed by the failed gateway may be reassigned to one or more other gateways to restore management of the network elements for which the failed gateway was responsible. If a gateway's state transitions from DOWN to UP, indicating restoration of gateway operation, actions may be triggered to resume management of the appropriate network elements by the restored gateway. For instance, management tasks may be reassigned back to the restored gateway from the gateways that substituted for the restored gateway during its failure.

State model 500 may be executing on central MS 202, or it may be implemented on the gateway monitoring system responsible for monitoring the gateway modeled by such state model 500. For instance, suppose that state model 500 models SNMP gateway 211 of FIG. 4. In one embodiment, state model 500 is implemented on central MS 202. That is, software is executing on central MS 202 to implement state model 500 for modeling SNMP gateway 211. Upon gateway monitoring system 401 detecting a failure of such SNMP gateway 211, it notifies central MS 202 of such failure, and in response to receiving notice of such failure, state model 500 transitions from UP to DOWN, thereby triggering appropriate action(s) for recovering management of the SNMP devices for which SNMP gateway 211 was responsible. In another embodiment, state model 500 is implemented on gateway monitoring system 401. That is, software is executing on gateway monitoring system 401 to implement state model 500 for modeling SNMP gateway 211. Upon gateway monitoring system 401 detecting a failure of such SNMP gateway 211, state model 500 executing thereon transitions from UP to DOWN, thereby triggering appropriate action(s) for recovering management of the SNMP devices for which SNMP gateway 211 was responsible. One of such actions may include notifying central MS 202 of the failure of SNMP gateway 211.

According to various embodiments of the present invention, polling of gateways by monitoring systems 401 and 402, as well as use of states to model the gateways' operation, enable efficient detection of gateway failure. For instance, failure of a gateway process may be efficiently detected in a number of ways. For example, if the gateway process is not communicating information to the MS (as expected) may be an indication of a failure of the gateway process. Alternatively, the central MS may detect a network failure in one of the communication links between it and a gateway. As a further example, the gateway box may communicate an unsolicited message, such as a trap, that indicates the loss (or failure) of the gateway process or some portion of the gateway hardware. Furthermore, according to certain embodiments of the present invention, monitoring systems 401 and 402 may periodically poll the gateway processes (e.g., poll once every "t" minutes). The efficiency of monitoring for gateway failure generally increases with a sufficiently small polling interval "t," which minimizes the overall recovery time. According to various embodiments, such polling may occur not only according to a predetermined polling interval, but may also be triggered upon the occurrence of an event. For instance, if the MS does not receive an expected message from a gateway process, then, responsive to the expected message not being received, the gateway's monitoring system may trigger a poll of such gateway process to ensure that such gateway process is operational.

Figure 6:
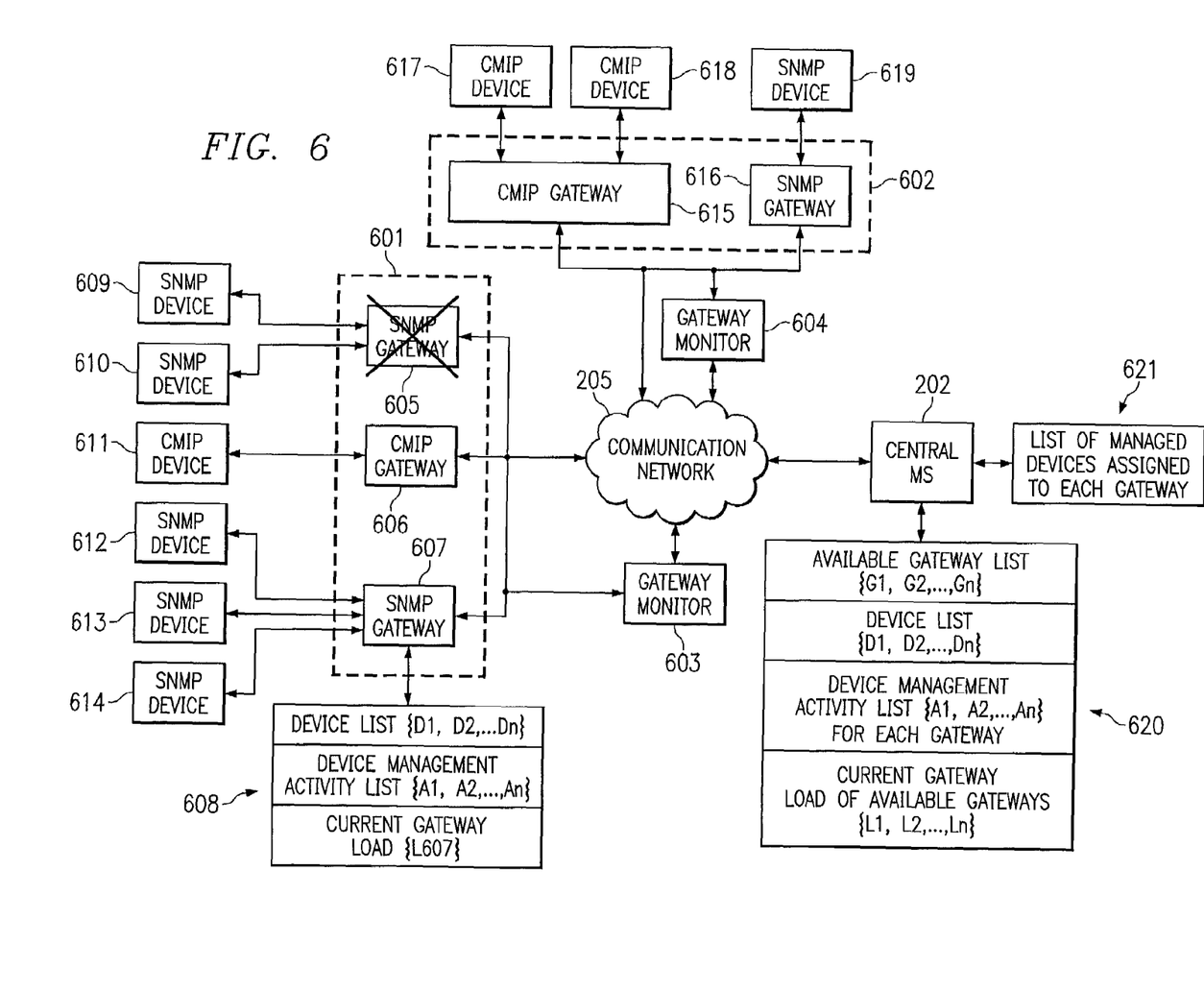
FIG. 6 shows an exemplary implementation of one embodiment of the present invention for detecting failure of a distributed gateway and recovering management of network elements for which such failed gateway had management responsibility.

Turning now to FIG. 6, an exemplary implementation of one embodiment of the present invention is shown. As shown, central MS 202 may be communicatively coupled, via communication network 205, to numerous groups of gateways distributed about various geographic locations, such as groups 601 and 602. For example, gateway group 601 may be implemented at one geographic location of a managed network and group 602 may be implemented at another geographic location of such managed network. In this example, group 601 includes SNMP gateways 605 and 607 and CMIP gateway 606. As shown, SNMP gateway 605 is responsible for managing (e.g., polling) SNMP devices 609 and 610. CMIP gateway 606 is responsible for managing CMIP device 611, and SNMP gateway 607 is responsible for managing SNMP devices 612, 613, and 614. Also, group 602 includes CMIP gateway 615, which is responsible for managing CMIP devices 617 and 618, and SNMP gateway 616, which is responsible for managing SNMP device 619.

Gateway monitoring system 603 may be included for monitoring the health of the gateways of group 601, and gateway monitoring system 604 may be included for monitoring the health of the gateways of group 602. As also shown in the example of FIG. 6, gateway management description information may be maintained, such as gateway management description information 608, 620, and 621. Gateway management description information may be stored locally to each gateway (e.g., either internal or external to such gateway). For instance, in the example of FIG. 6, SNMP gateway 607 has gateway management description information 608 stored local thereto, which includes information describing the management responsibilities of such SNMP gateway 607. Although not shown in FIG. 6, the various other distributed gateways may have similar gateway management description information stored locally to describe their respective management responsibilities. Gateway management description information 608 may include a device list identifying the devices (D1, D2, . . . , Dn) that SNMP gateway 607 is responsible for managing (e.g., is responsible for receiving unsolicited messages and/or polling). In the example of FIG. 6, the device list for SNMP gateway 607 may include SNMP devices 612, 613, and 614. Gateway management description information 608 may also include a device management activity list identifying the management activities (A1, A2, . . . , An) for which SNMP gateway 607 is responsible for performing. For example, the device management activity list for SNMP gateway 607 may include various polling activities that are to be performed by SNMP gateway 607 in managing SNMP devices 612, 613, and 614.

Gateway management description information 608 may also include the current gateway load for SNMP gateway 607 (e.g., load "L607"). The gateway load identifies the operational burden placed on SNMP gateway 607. In one embodiment, such gateway load may be computed as a function of the number of devices managed by a particular gateway and the management activities for which the particular gateway is responsible. For instance, in one implementation gateway load may be computed as: $L = \Sigma_{l=1}^{l=n} D_l (\Sigma_{k=1}^{k=n} A_k * ActivityType(A_k))$, where L represents the load of a particular gateway, D represents a device managed by the particular gateway (wherein the particular gateway manages any number "n" of devices), A represents a management activity performed by the gateway (wherein any number "k" of management activities may be performed for a given device), and ActivityType represents the type of management activity $A_k$. For instance, different types of management activities may result in a different operational burden placed on the particular gateway. For example, a polling activity that polls a device for its CPU utilization may be a first activity type, and a polling activity that polls a device having multiple cards for the CPU utilization of each card may be a second activity type (because it may place a greater operational burden on the polling gateway). Thus, ActivityType may be a constant value representing the amount of operational burden that the particular activity $A_k$ places on the particular gateway.

Gateway management description information may also be stored local to central MS 202 (e.g., either internal or external to central MS 202). For instance, in the example of FIG. 6, central MS 202 has gateway management description information 620 and 621 stored local thereto, which includes information describing the management responsibilities of the distributed gateways communicatively coupled to central MS 202. Gateway management description information 621 may include a list of managed devices to which each gateway is assigned management responsibility. For instance, gateway management description information 621 may specify that SNMP gateway 605 is responsible for SNMP devices 609 and 610 and SNMP gateway 607 is responsible for SNMP devices 612, 613, and 614. Such assignment information may be used, for example, to properly reassign management responsibilities back to a that previously failed gateway from substitute gateways once operation is restored to such gateway.

Gateway management description information 620 may include an available gateway list identifying the available distributed gateways (G1, G2, . . . , Gn) that are communicatively coupled to central MS 202. In the example of FIG.

6, such list of available distributed gateways may include SNMP gateways 605, 607, and 616, and CMIP gateways 606 and 615. If SNMP gateway 605 fails (as shown in FIG. 6), then it may be removed from the available gateway list until it regains operability. Gateway management description 620 may also include a device list identifying the devices (D1, D2, ..., Dn) that each of the available distributed gateways is responsible for managing (e.g., is responsible for receiving unsolicited messages and/or polling). Gateway management description information 620 may also include a device management activity list identifying the management activities (A1, A2, ..., An) for which each of the available distributed gateways is responsible for performing. Also, the gateway load for each of the available distributed gateways may be maintained within gateway management description information 620. As described in greater detail hereafter, such gateway load information may be utilized in certain embodiments to intelligently reallocate management responsibilities during management recovery in a manner that balances the load among a plurality of the available distributed gateways.

In the example of FIG. 6, SNMP gateway 605 has failed. That is, either the hardware or software of SNMP gateway 605 has failed, thereby resulting in SNMP gateway 605 being unable to properly manage SNMP devices 609 and 610. According to at least one embodiment, gateway monitoring system 603 detects such a failure through its polling of the gateway, and communicates notice of such failure to central MS 202. As described with FIG. 5 above, in at least one embodiment, a state-based approach is implemented for the distributed gateways. For example, a state model for SNMP gateway 605 may be executing on central MS 202, and upon central MS 202 receiving notice that SNMP gateway 605 has failed, the state model for SNMP gateway 605 transitions from an UP state to a DOWN state, which triggers activities to recover management of SNMP devices 609 and 610.

According to various embodiments of the present invention, management of SNMP devices 609 and 610 may be recovered by assigning one or more other suitable gateways (e.g., substitute gateways) to take over management of such SNMP devices 609 and 610. That is, one or more other SNMP gateways that are "available" may be assigned management responsibility of SNMP devices 609 and 610. For another SNMP gateway to be considered "available," it may be required to be operational (e.g., included within the available gateway list of gateway management description information 620) and, in some embodiments, may be required to satisfy other criteria, such as being located within a particular geographic location (e.g., a geographic location relatively near SNMP devices 609 and 610).

Once the proper one(s) of the available gateways to be assigned management responsibility (in the manner described below), recovery information may be provided to such "substitute" gateways to enable them to recover management of the network elements for which the failed gateway had responsibility. For instance, in one embodiment, such recovery information is defined as:

"recovery information=(managed device list, management activities for the devices)."

Thus, a substitute gateway that is assigned management responsibility for a device for which a failed gateway was responsible for managing in order to recover management of such device will receive such recovery information (e.g., from central MS 202) in order to determine the particular device(s) to be managed and the particular management activities to be performed for such particular device(s). For instance, in the example of FIG. 6, recovery information may be provided to SNMP gateway 607 to enable it to perform the proper management activities of SNMP devices 609 and 610 responsive to the failure of SNMP gateway 605.

According to various embodiments, such assignment of management responsibilities of SNMP devices 609 and 610 to one or more substitute gateways is performed in an efficient manner to minimize the amount of time that SNMP devices 609 and 610 are without management. One embodiment attempts to notify a system administrator (or other appropriate personnel) of the failure of SNMP gateway 605, and such system administrator (or other appropriate personnel) may then manually assign SNMP devices 609 and 610 to one or more other SNMP gateways, such as SNMP gateway 607. However, the time required for the system administrator to be notified and make such a manual assignment may unnecessarily delay the recovery of management of SNMP devices 609 and 610. For instance, in certain embodiments, central MS 202 is implemented to autonomously assign management of SNMP device 609 and 610 to one or more other substitute SNMP gateways in a desired manner, thereby eliminating the delay associated with notifying a system administrator and such system administrator manually assigning management of SNMP device 609 and 610 to substitute gateways.

Various approaches may be implemented to enable central MS 202 to autonomously perform management recovery. In one embodiment, a user (e.g., system administrator) may preassign substitute gateway(s) to be utilized in the event of a failure of each distributed gateway. For instance, a user may specify to central MS 202 that if SNMP gateway 605 fails, SNMP gateway 607 is to be assigned responsibility for managing SNMP devices 609 and 610. Accordingly, when SNMP gateway 605 fails, central MS 202 may autonomously assign its management activities to SNMP gateway 607 as predefined by the user. Thus, central MS 202 may provide a user interface that enables a user, such as a system administrator, to preassign one or more substitute gateways to be utilized in management recovery in the event of a failure of a certain gateway.

In another embodiment, the user may specify certain rules for the central MS to follow in recovering management, rather than specifying specific substitute gateways. That is, central MS 202 may provide a user interface that enables a user to define rules to be followed in performing management recovery. For example, the user may instruct central MS 202 to first attempt to utilize another suitable gateway within a common group (or common geographic location), and if such another suitable gateway is not available within a common group to then attempt to utilize an available gateway nearest the location of the failed gateway. Thus, for instance, following such rules, central MS 202 may, in response to failure of SNMP gateway 605, first attempt to assign management of SNMP devices 609 and 610 to SNMP gateway 607, and if SNMP gateway 607 were unavailable (e.g., also not operational), central MS 202 would attempt to assign management of SNMP devices 609 and 610 to an available SNMP gateway that is nearest the location of SNMP gateway 605 (such as SNMP gateway 616).

In still another embodiment, central MS 202 may autonomously perform management recovery according to a load balancing algorithm. For instance, it may be desirable to not only recover management of SNMP devices 609 and 610, but also to recover management of such devices in an intelligent manner that minimizes the impact on other management gateways (e.g., that balances the operational load placed on each management gateway). Various types of load balancing algorithms may be utilized in performing the management recovery. As an example, one embodiment utilizes a "greedy algorithm" to perform load balancing. A greedy algorithm generally makes the choice that appears best at the moment. That is, a greedy algorithm generally makes a locally optimal choice in the hope that such choice will lead to a globally optimal solution.

Figure 7:
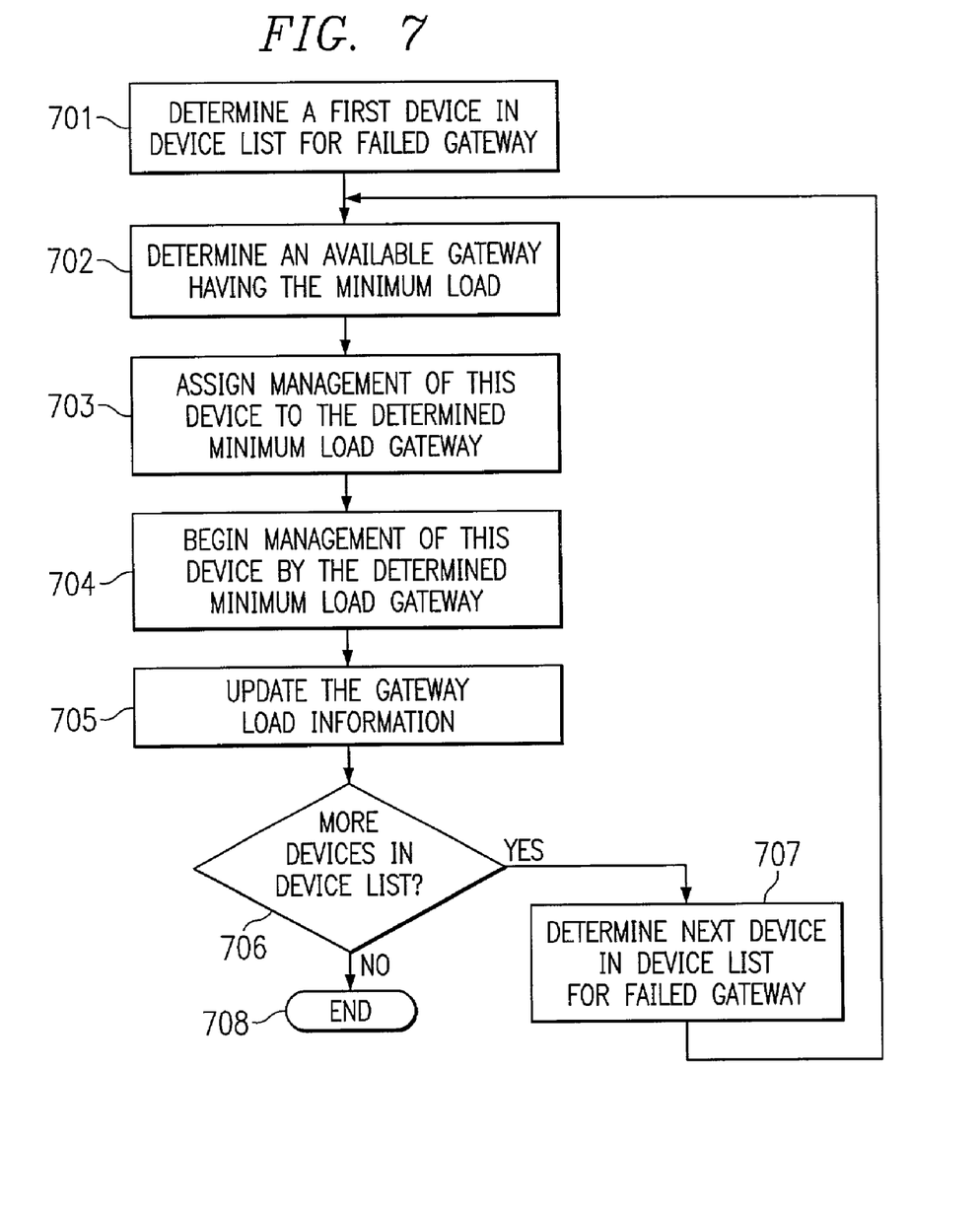
FIG. 7 shows an exemplary flow chart of a greedy algorithm that may be implemented to perform load balancing in management recovery.

An exemplary flow chart of a greedy algorithm that may be implemented is shown in FIG. 7. As shown, once a failed gateway is detected, a first device for which such failed gateway has management responsibility is determined at operational block 701. At block 702, an available gateway having the minimum load is determined. Management of the device is then assigned to the determined minimum load gateway at block 703. Thereafter, at block 704, such determined minimum load gateway may begin management of the device, thereby completing management recovery for that device. At block 705, the gateway load information is updated to reflect management of such device being assigned to the gateway determined in block 702 as having the minimum load. It is then determined, at block 706, whether further devices exist for which the failed gateway has management responsibility. If further devices do exist, then the next of such devices is determined at block 707, and operation returns to block 702 to determine an available gateway now having the minimum load and operation then advances through operational blocks 703–706. Once it is determined at block 706 that no further devices exist for which the failed gateway has management responsibility, thereby meaning that management has been recovered for all of the devices for which the failed gateway was responsible, the management recovery process ends at block 708.

As an example of utilizing such a load balancing algorithm to enable efficient management recovery, attention is directed again to the example of FIG. 6. Upon receiving notice that SNMP gateway 605 has failed, central MS 202 may execute such a greedy algorithm as that of FIG. 7 to perform load balancing in recovering management of SNMP devices 609 and 610. Thus, according to one implementation of such greedy algorithm, a first device in the device list for SNMP gateway 605 may be determined, such as SNMP device 609. Of the available gateways (which may be limited to other SNMP gateways of group 601 that are operational or may include any other SNMP gateways that are operational, as examples), an available gateway having the minimum load is determined. For instance, the load of all SNMP gateways included within the available gateway list of description information 620 may be computed, and the SNMP gateway having the smallest load may be determined therefrom. Management of SNMP device 609 may therefore be assigned to the SNMP gateway having the minimum load, wherein sufficient recovery information will be provided from central MS 202 to such SNMP gateway, such as identification of SNMP device 609 and the management activities to be performed for such SNMP device 609. The SNMP gateway assigned such management responsibility will then begin managing SNMP device 609, just as SNMP gateway 605 was prior to its failure. The gateway load for the SNMP gateway assigned such management responsibility is then re-computed, and the process is repeated to determine an appropriate gateway to take over management of SNMP device 610.

As described above, more than just current gateway load may be considered in determining the most appropriate gateway to take over management of a device for a failed gateway. For instance, it may be desirable to have a gateway that is located relatively near the device to be managed to assume management responsibility of such device. For instance, it may be undesirable to have a gateway implemented on the East coast of the United States to take over management of a device located on the West coast of the United States. Thus, in certain embodiments, in central MS 202 assigning management responsibility of a device having a failed gateway, it may take into consideration the locality of the available gateways, as well as other factors, to intelligently determine the optimum solution for management recovery.

It should be recognized that the detection and recovery techniques described herein may be utilized within any client/server environment and may be applied to devices other than gateways for managing network elements. Accordingly, various embodiments of the present invention are not intended to be limited solely for recovering management of network elements managed by a failed gateway, as described above, but rather various embodiments may be implemented for recovering any type of processing for which a client process has responsibility for performing upon failure of such client process. Thus, the various embodiments described herein for recovering management activities performed by a failed gateway are intended as examples that render the disclosure enabling for application to any other types of client processes for which recovery is desired upon the occurrence of a failure of such client processes.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of recovering management of one or more network elements, said method comprising:
communicatively coupling the one or more network elements with at least one a plurality of distributed gateways;
communicatively coupling the at least one distributed gateway with at least one gateway monitoring system;
communicatively coupling the at least one gateway monitoring system with a central management system;
monitoring operation, by the at least one gateway monitoring system, of the plurality of distributed gateways, each of the plurality of distributed gateways responsible for managing the one or more network elements;
detecting failure by the at least one gateway monitoring system, of one of the plurality of distributed gateways, wherein the detecting comprises the steps of:
means for determining at least one type of the failure, means for distinguishing at least one source of the failure selected from the group consisting of hardware failures, software failures, and communication port failures, means for presenting to the user at least one reason for the failure based on the at least one type of the failure and the at least one source of the failure, means for presenting to the user at least one action that could be taken by the central management system to resolve the at least one failure, and means for receiving at least one selection of the at least one action;

receiving a notice of the detected failure from the at least one gateway monitoring system at the central management system; and responsive to said receiving step, recovering, by the central management system, management of the one or more network elements for which the failed one of the plurality of distributed gateways had management responsibility by assigning management responsibility to at least one other of the plurality of distributed gateways.

2. The method of claim 1 wherein said managing the one or more network elements includes translating from one protocol utilized by the one or more network elements to another protocol.

3. The method of claim 1 wherein said plurality of distributed gateways are communicatively coupled to a processor-based management system.

4. The method of claim 3 further comprising the step of: said management system controlling said recovering step.

5. The method of claim 1 wherein said detecting step further includes the step of: said one or more gateway monitoring systems polling said plurality of distributed gateways.

6. The method of claim 1 further comprising the step of: said one or more gateway monitoring systems controlling said recovering step.

7. The method of claim 1 further comprising the step of: determining management activities for which a detected failed gateway is responsible for performing.

8. The method of claim 7 further comprising the step of: determining one or more available gateways from said plurality of distributed gateways, which are available for assuming at least a portion of said management activities of said detected failed gateway.

9. The method of claim 8 wherein said one or more available gateways are a subset of said plurality of distributed gateways.

10. The method of claim 8 wherein said available gateways are gateways local to said detected failed gateway.

11. The method of claim 8 further comprising the step of: grouping two or more of said plurality of distributed gateways.

12. The method of claim 11 wherein said step of determining one or more available gateways, includes determining gateways that are included in a common grouping with said detected failed gateway.

13. The method of claim 11 wherein said grouping is predetermined based at least in part on a criteria selected from the group consisting of:
gateway communication protocol, gateway location, and any user-defined criteria.

14. The method of claim 8 wherein said recovering step further includes the step of:
distributing said management activities of said detected failed gateway to at least one of said one or more available gateways.

15. The method of claim 14 wherein said distributing step further includes the steps of:
determining operational load of said available gateways; and
performing load balancing in distributing said management activities to said at least one of said one or more available gateways.

16. The method of claim 15 wherein said load balancing is performed autonomously by a processor-based system.

17. The method of claim 16 wherein said load balancing further comprises the steps of:
determining the operational load for each of said management activities; and
allocating said management activities to one or more of said available gateways in a manner that approximately balances each of their operational loads.

18. The method of claim 17 wherein said operational load of said available gateways is determined dynamically, and allocation of said management activities is determined based at least in part on said determined operational load of said available gateways.

19. The method of claim 16 wherein said load balancing is performed according to a greedy algorithm.

20. The method of claim 7 wherein said recovering step further includes the step of:
distributing said management activities of said detected failed gateway to at least one other of said plurality of distributed gateways.

21. The method of claim 20 wherein said distributing step is autonomously performed by a processor-based system.

22. The method of claim 20 wherein said distributing step further includes the steps of:
determining operational load of said available gateways; and
performing load balancing in distributing said management activities to said at least one other of said plurality of distributed gateways.

23. The method of claim 1 wherein said plurality of distributed gateways are operable to translate from one plurality of different protocols to another plurality of different protocols.

24. The method of claim 1 further comprising the step of:
user predefining at least one of said plurality of distributed gateways to be used in recovering management of one or more network elements for which a particular one of said plurality of distributed gateways has management responsibility in the event of a failure of said particular one of said plurality of distributed gateways.

25. The method of claim 1 further comprising the step of:
user predefining criteria to be used in recovering management of one or more network elements in the event of a failure of one of said plurality of distributed gateways.

26. A system comprising:
plurality of network elements;
plurality of distributed gateways each communicatively coupled to one or more of said plurality of network elements, wherein each of said plurality of distributed gateways is responsible for managing one or more of said plurality of network elements;
gateway monitoring system communicatively coupled to said plurality of distributed gateways, wherein said gateway monitoring system is operable to detect failure of at least one of said distributed gateways;
means for determining at least one type of the failure;

means for distinguishing at least one source of the failure selected from the group consisting of hardware failures, software failures, and communication port failures;

means for presenting to the user at least one reason for the failure based on the at least one type of the failure and the at least one source of the failure;

means for presenting to the user at least one action that could be taken by the central management system to resolve the at least one failure;

means for receiving at least one selection of the at least one action; and management recovery system communicatively coupled to said plurality of distributed gateways, wherein said management recovery system is operable to autonomously recover management of said one or more network elements for which a detected failed gateway had management responsibility.

27. The system of claim 26 wherein said management recovery system is operable to assign management responsibility of said one or more network elements for which said detected failed gateway had management responsibility to at least one other of said plurality of distributed gateways.

28. The system of claim 26 wherein said managing one or more of said network elements includes translation from one protocol utilized by said one or more network elements to another protocol.

29. The system of claim 26 wherein said gateway monitoring system and said management recovery system are integrated on a common platform.

30. The system of claim 26 wherein said gateway monitoring system is operable to poll said plurality of distributed gateways.

31. The system of claim 26 wherein said management recovery system is operable to determine management activities for which said detected failed gateway is responsible for performing.

32. The system of claim 31 wherein said management recovery system is operable to determine one or more available gateways from said plurality of distributed gateways, which are available for assuming at least a portion of said management activities of said detected failed gateway.

33. The system of claim 32 wherein said one or more available gateways are a subset of said plurality of distributed gateways.

34. The system of claim 32 wherein said available gateways are gateways local to said detected failed gateway.

35. The system of claim 32 wherein said available gateways are gateways operable to translate a common communication protocol as said detected failed gateway.

36. The system of claim 32 wherein said management recovery system is further operable to distribute said management activities of said detected failed gateway to at least one of said one or more available gateways.

37. The system of claim 36 wherein said management recovery system is operable to determine operational load of said available gateways, and perform load balancing in distributing said management activities to said at least one of said one or more available gateways.

38. The system of claim 37 wherein in performing said load balancing said management recovery system is operable to determine the operational load for each of said management activities, and allocate said management activities to one or more of said available gateways in a manner that approximately balances each of their operational loads.

39. The system of claim 37 wherein said management recovery system further comprises:

software code executable by said management recovery system, said software code implementing a greedy algorithm for controlling said load balancing.

40. The system of claim 26 wherein said management recovery system further comprises:

software code executable by said management recovery system to present a user interface for alerting a user of said detected failed gateway.

41. The system of claim 26 wherein said management recovery system further comprises:

software code executable by said management recovery system to present a user interface that enables a user to predefine, before said gateway monitoring system detects a failed gateway, at least one of said plurality of distributed gateways to be used in recovering management of one or more network elements for which a particular one of said plurality of distributed gateways has management responsibility in the event of a failure of said particular one of said plurality of distributed gateways.

42. The system of claim 26 wherein said management recovery system further comprises:

software code executable by said management recovery system to present a user interface that enables a user to predefine criteria, before said gateway monitoring system detects a failed gateway, to be used in recovering management of one or more network elements in the event of a failure of one of said plurality of distributed gateways.

43. A system for recovering management of one or more network elements responsive to failure of a distributed gateway, said system comprising:

plurality of distributed gateways, each for managing one or more network elements;

a gateway monitoring system communicatively coupled to said plurality of distributed gateways, said gateway monitoring system capable of detecting failure of anyone of said distributed gateways;

means for determining at least one type of the failure;

means for distinguishing at least one source of the failure selected from the group consisting of hardware failures, software failures, and communication port failures;

means for presenting to the user at least one reason for the failure based on the at least one type of the failure and the at least one source of the failure;

means for presenting to the user at least one action that could be taken by the central management system to resolve the at least one failure;

means for receiving at least one selection of the at least one action;

means communicatively coupled to said gateway monitoring system for receiving a notice of the detected failure at a central management system; and means, responsive to said means for receiving a notice of the detected failure of one of said distributed gateways, for autonomously recovering, by the central management system, management of one or more network elements for which the detected failed gateway had management responsibility.

44. The system of claim 43 wherein the means for autonomously recovering management comprises logic for assigning management responsibility of said one or more network elements for which said detected failed gateway had management responsibility to at least one other of said plurality of distributed gateways.

45. The system of claim 44 wherein said logic includes software code executable by said means for autonomously recovering management.

46. The system of claim 43 wherein said managing one or more network elements includes translation from one protocol utilized by said one or more network elements to another protocol.

47. The system of claim 43 wherein said means for detecting failure comprises logic for polling said plurality of distributed gateways.

48. The system of claim 47 wherein said logic includes software code executable by said means for detecting failure.

49. The system of claim 43 further comprising:
means for determining management activities for which said detected failed gateway is responsible for performing.

50. The system of claim 49 further comprising:
means for determining one or more available gateways from said plurality of distributed gateways, which are available for assuming at least a portion of said management activities of said detected failed gateway.

51. The system of claim 50 wherein said one or more available gateways are a subset of said plurality of distributed gateways.

52. The system of claim 50 wherein said available gateways are determined as gateways local to said detected failed gateway.

53. The system of claim 50 wherein said available gateways are determined as gateways operable to translate a common protocol as said detected failed gateway.

54. The system of claim 50 wherein said means for autonomously recovering management comprises logic for allocating said management activities of said detected failed gateway to at least one of said one or more available gateways.

55. The system of claim 54 further comprising:
means for determining operational-load of said available gateways, wherein said means for autonomously recovering management comprises logic for performing load balancing in allocating said management activities to said at least one of said one or more available gateways.

56. The system of claim 55 further comprising:
means for determining the operational load for each of said management activities, wherein said means for autonomously recovering management comprises logic for allocating said management activities to one or more of said available gateways in a manner that approximately balances each of their operational loads.

* * * * *

UNITED STATES PATENT AND TRADEMARK OFFICE
CERTIFICATE OF CORRECTION

| | | |
|---|---|---|
| PATENT NO. | : 7,209,968 B1 | Page 1 of 1 |
| APPLICATION NO. | : 09/870159 | |
| DATED | : April 24, 2007 | |
| INVENTOR(S) | : Secer | |

It is certified that error appears in the above-identified patent and that said Letters Patent is hereby corrected as shown below:

In column 24, line 13, in Claim 55, delete "operational–load" and insert -- operational load --, therefor.

Signed and Sealed this

Twenty-first Day of August, 2007

JON W. DUDAS
*Director of the United States Patent and Trademark Office*